United States Patent Office 3,536,715
Patented Oct. 27, 1970

3,536,715
2-LOWER ALKYL-5-[ω-(4-PHENYL-1-PIPERAZINYL) LOWER ALKYL]-2H-TETRAZOLES
Shin Hayao, Elkhart, and Wallace Glenn Strycker, Goshen, Ind., assignors to Miles Laboratories, Inc., Elkhart, Ind., a corporation of Indiana
No Drawing. Filed Mar. 24, 1967, Ser. No. 625,615
Int. Cl. C07d 55/56
U.S. Cl. 260—268         1 Claim

ABSTRACT OF THE DISCLOSURE

Tetrazole derivatives, generally 2 - substituted-5-(ω-dialkylaminoalkyl)-2H-tetrazoles, having hypotensive and antiadrenergic properties. A process for the preparation of these compounds including the alkylation of a 5-(ω-dialkylaminoalkyl)-2H-tetrazole with a suitable alkyl halide.

---

This invention relates to tetrazole derivatives and more particularly to 2-substituted-5-(ω-dialkylaminoalkyl)-2H-tetrazoles having desirable pharmacological properties. The compounds of this invention can be represented by the structural formula:

$$R_2NC_nH_{2n}-C\underset{N=N}{\overset{N-N-R'}{\diagup}}$$

wherein $R_2N$ is selected from a group consisting of 4-phenyl-1-piperazinyl, substituted 4-phenyl-1-piperazinyl, 4-phenyl-1-piperidyl, 4-hydroxy-4-phenyl-1-piperidyl, 4-methyl-1-piperazinyl, morpholinyl, 1-piperidyl, and dialkylamino; and $n$ is an integer of from about 1 to 4. In the above structural formula R' represents ω-dialkylaminoalkyl, lower alkyl, ω-(4-aryl-1-piperazinyl) alkyl and ω-(4-aryl-1-piperidyl) alkyl.

The compounds of this invention can be furnished in the form of various salts, for example, salts of mineral acids such as the hydrochloride. The tetrazole compound of this invention can also be isolated as salts of various organic acids such as the oxalate or maleate. Salts which are pharmacologically acceptable are preferably used.

These compounds are generally prepared by the alkylation of 5-(ω-dialkylaminoalkyl)-2H-tetrazole with a suitable alkyl halide. The 5-(ω-dialkylaminoalkyl)-2H-tetrazole can be prepared from the corresponding nitrile. The entire process may then consist of a two-step process according to the following equation:

$$R_2NC_nH_{2n}CN \xrightarrow[DNF]{HN_3, NH_4Cl} R_2NC_nH_{2n}-C\underset{N=N}{\overset{N-NH}{\diagup}} \xrightarrow[Na/EtOH]{XR'} R_2NC_nH_{2n}-C\underset{N=N}{\overset{N-N-R'}{\diagup}}$$

wherein $R_2N$, $n$ and $R'$ correspond respectively to the above description and X represents the halogen of an alkyl halide and is preferably chlorine. However, when the desired 5-(ω-dialkylaminoalkyl)-2H-tetrazole is available the reaction may comprise a single step alkylation (the second step of the above equation) to form the tetrazole derivative.

In the first step of this two-step process a suitable aminoalkyl nitrile is reacted with an azide salt of a monovalent cation such as sodium azide, lithium azide, potassium azide, ammonium azide, a substituted ammonium azide, or the like or hydrazoic acid in the presence of a suitable catalyst and solvent. Preferably an organic solvent that facilitates the reaction is used. An ionizing solvent, such as dimethylformamide in which the reactants are soluble, is advantageously used. For the catalyst, an ammonium compound such as ammonium chloride or an amine hydrochloride is preferred. Other Lewis acid catalysts, however, may be used. The reaction mixture is beneficially stirred while under reflux for a period between about 8 and 24 or more hours.

To form the desired tetrazole derivative, the intermediate product or available desirable 5-(ω-dialkylaminoalkyl)-2H-tetrazole may be reacted with a suitable aminoalkyl halide in the presence of a basic catalyst. This basic catalyst is beneficially a basic alkoxide and preferably sodium ethoxide, as shown in the general reaction equation. The reaction conditions are not considered critical and are preferably carried out under reflux with stirring for extended periods of time, such as between about 7 and 24 hours or more, or in a suitable autoclave for similar periods of time.

The novel 2 - substituted-5(ω-dialkylaminoalkyl)-2H-tetrazoles of this invention are useful as hypotensive and anti-adrenergic agents and can be formulated as unit dosage forms for oral administration in accordance with accepted pharmaceutical principles.

This invention will be better understood by reference to the following examples.

EXAMPLE I 2,5-bis[3-(4-phenyl-1-piperidyl)propyl]tetrazole (A) 5 - [3-(4-phenyl-1-piperidyl)propyl]tetrazole.—A mixture of 1-(3-cyanopropyl)4-phenylpiperidine (71.0 g., 0.312 mole), sodium azide (45.5 g., 0.7 mole), ammonium chloride (37.5 g., 0.7 mole) in 200 ml. of DMF was stirred under reflux for 8 hours and set aside at room temperature overnight. The mixture was filtered to remove a solid which was washed with absolute ethanol and stirred in water to remove inorganic salt. The water insoluble solid was collected and dried in air, M.P. 245–246° C. (dec.), yield 69.7 g. The solid was recrystallized from about 1 l. of aqueous methanol-ethyl acetate to give a pure product of M.P. 244–245° C. (dec.), yield 47.2 g.

Analysis.—Calcd. for $C_{15}H_{21}N_5$ (percent): C, 66.5; H, 7.75; N, 25.8. Found (percent): C, 67.0; H, 7.82; N, 26.0.

The filtrate was boiled down until a solid began to come out from the hot solution. After cooling to room temperature, the mixture was diluted with ether and a light tan solid was collected, M.P. 243–245° C. (dec.), yield 20.5 g. The total recovery was 67.7 g.

A sample (10 g.) from the first crop was suspended in methanol, saturated with dry hydrogen chloride to give a clear solution which was filtered and diluted with ether to give 8.3 g. of the hydrochloride of M.P. 203–204° C. (dec.).

Analysis.—Calcd. for $C_{15}H_{21}N_5 \cdot HCl$ (percent): C, 58.5; H, 7.16; N, 22.8. Found (percent): C, 58.9; H, 7.04; N, 22.5.

(B) 2,5-bis[3-(4-phenyl - 1 - piperidyl)propyl]tetrazole.—To 150 ml. of absolute ethanol was added sodium (1.7 g., 0.074 mole) to give a clear solution. The above tetrazole (20.0 g., 0.074 mole) was added all at once to give a clear solution. 1-(3-chloropropyl)-4-phenylpiperidine (17.7 g., 0.074 mole) was added to the above solution at once and a pale yellow solution resulted that was stirred under reflux for 7 hours. Sodium chloride which had formed was removed and the solvent was removed in vacuo to give a light amber syrup. The free base was extracted with chloroform, washed with water and dried over anhydrous magnesium sulfate. The solvent was removed in vacuo and the residue was dissolved in methanol. The methanolic solution was treated with dry hydrogen chloride to give a clear solution. Ethyl aceta-ether mixture was added to give a colorless solid of M.P. 215–221° C. (dec.), yield 27.6 g. The salt was recrystallized two times from methanol-ether to give 21.6 g. of the pure dihydrochloride, M.P. 218–220° C. (dec.).

*Analysis.*—Calcd. for $C_{29}H_{40}N_6 \cdot 2HCl$ (percent): C, 64.2; H, 7.75; N, 15.5. Found (percent): C, 63.8; H, 7.80; N, 15.4.

EXAMPLE II 2-ethyl-5-[2-(4-phenyl - 1 - piperazinyl)ethyl]tetrazole dihydrochloride.—5-[2-(4-phenyl - 1 - piperazinyl)ethyl]tetrazole dihydrochloride (14 g., 0.042 mole) and ethyl bromide (4.6 g., 0.042 mole) were added to a solution of sodium (2.9 g., 0.127 mole) in 150 ml. of anhydrous ethanol and the mixture was heated in an autoclave at about 80° C. for 7 hours. The solvent was removed in vacuo and the concentrate was suspended in water. The free base was extracted with chloroform. The extracts were concentrated in vacuo to a solid and the solid was dissolved in hot methanol, saturated with dry HCl, filtered and the filtrate was diluted with ether to form a crystalline salt. Yield 6.3 g., M.P. 202.4° C. (dec.).

*Analysis.*—Calcd. for $C_{15}H_{22}N_6 \cdot 2HCl$ (percent): C, 50.1; H, 6.69; N, 23.4. Found (percent): C, 49.9; H, 6.89; N, 23.2.

EXAMPLE III

2-[3-(4-p-fluorophenyl - 1 - piperazinyl)propyl]-5-[3-(4-phenyl-1-piperidyl)-propyl]tetrazole dioxalate.—5-[3-(4-phenyl-1-piperidyl)propyl]tetrazole (16.6 g., 0.061 mole) was added to a solution of sodium (1.5 g., 0.061 mole) in 200 ml. of anhydrous ethanol and the solution was heated under reflux for about 30 minutes. 4-p-fluorophenyl - 1 - (3 - chloropropyl)piperazine (15.7 g., 0.061 mole) was added and the solution heated under reflux with stirring for about 20 hours. The solution was concentrated in vacuo treated with water and the free base extracted with chloroform. The extracts were concentrated in vacuo and the concentrate was dissolved in hot methanol to which a methanol solution of oxalic acid (16 g., 0.18 mole) was added. The methanol solution was heated on a steam bath. The hot solution was filtered, diluted with ether and cooled. The resulting solid was collected and recrystallized from an aqueous-methanol-ether solution. Yield 20.4 g., M.P. 156–159° C. (dec.).

*Analysis.*—Calcd. for $C_{28}H_{38}FN_7 \cdot C_4H_4O_8$ (percent): C, 57.22; H, 6.26; N, 14.61. Found (percent): C, 57.04; H, 6.44; N, 14.45.

The foregoing description and examples illustrate specific embodiments of some of the novel compounds that may be prepared in accordance with this invention.

What is claimed is:

1. A compound which is 2-ethyl-5-[2-(4-phenyl-1-piperazinyl)ethyl]tetrazole.

References Cited

UNITED STATES PATENTS

| | | | |
|---|---|---|---|
| 2,470,085 | 5/1949 | Harvill et al. | 260—308 |
| 2,852,515 | 9/1958 | Elpern | 260—247.5 |
| 3,155,666 | 11/1964 | Cusic | 260—268 |
| 3,231,574 | 1/1966 | Strycker et al. | 260—268 |
| 3,297,709 | 1/1967 | Davis | 260—308 |

ALEX MAZEL, Primary Examiner

A. M. T. TIGHE, Assistant Examiner

U.S. Cl. X.R.

260—293, 294, 247.5, 247.2, 308; 424—248, 250, 267, 269